UNITED STATES PATENT OFFICE.

LOUIS H. FLANDERS, OF JENKINTOWN, PENNSYLVANIA.

PROCESS OF MAKING PASTED STORAGE-BATTERY PLATES.

1,228,547.  Specification of Letters Patent.  Patented June 5, 1917.

No Drawing.  Application filed October 20, 1913. Serial No. 796,115.

*To all whom it may concern:*

Be it known that I, LOUIS H. FLANDERS, a citizen of the United States, residing at Jenkintown, in the county of Montgomery and State of Pennsylvania, have invented a certain new and useful Process of Making Pasted Storage-Battery Plates, of which the following is a specification.

The principal object of the present invention is to make pasted storage battery plates of uniform and predetermined capacity and porosity or specific density from varying raw material and under varying conditions of temperature, humidity and weather.

Heretofore the quantity of lead sulfate formed in the paste and consequently the porosity of the plates varied and was not controlled, because the binding agent added to form sulfate and give porosity was also relied upon to give the consistency necessary for pasting, and because the quantity of the agent required for the latter purpose varied with the composition and density of the lead oxids used, with the condition of the atmosphere, and with the length of time the paste had been made before application to the grids.

In the process of this invention the quantity of sulfate in the paste prior to its being applied to the grid and the porosity of the finished plate is fixed and determined independently of the consistency thereof but with regard to the density of the lead oxid or oxids used and to the capacity desired, so that the porosity of the finished plates can be controlled and made uniform.

One way of practising the present invention is to thoroughly mix the oxid or oxids of lead, which may have been previously wet with water, with that definite quantity of dilute sulfuric acid solution or other sulfating solution which is appropriate having regard to the density of the oxid or oxids used for producing in the paste the appropriate amount of sulfate for insuring the required porosity, and hence the desired capacity, and thereafter and after the sulfate forming reaction is completed tempering the paste if necessary with additional water to the required consistency for pasting. Instead of doing as above and after the lead oxids are first mixed with water a considerable quantity of comparatively strong sulfuric acid solution can be slowly added without producing a violent chemical reaction and with the formation of smooth homogeneous paste containing a greater amount of sulfate than it would be possible to form in the paste if a weak solution of acid was used instead, since in order to produce the desired quantity of sulfate it would be necessary to introduce so much water contained in the acid solution that the paste would be too fluid to be properly applied to a grid or plate. On the other hand if the strong acid were introduced into the dry oxids there would be enough of it to form the necessary sulfates, but by reason of the violence of the reaction the sulfates would not be uniformly distributed and the paste, even though afterward tempered with water, would be gritty and lumpy. By using a comparatively strong sulfuric acid solution or sulfuric acid solutions of different strengths, the amount of lead sulfate formed and hence the porosity of the finished plate can be varied within wide limits. The total amount of such solution will be comparatively small even where a comparatively large percentage of sulfate is desired. Upon completion of the sulfating reaction and after the desired quantity of sulfate has been formed, the paste is applied to the grids.

The paste made by this process is very smooth and free from the lumps always present in paste made by former methods. Such a paste, furthermore, has the advantage that it can be handled by machinery, since it is almost neutral or slightly alkaline. Since it sets slowly and can be kept in plastic condition in large masses for long periods, it will not clog up or interfere with the operation of a pasting machine. The setting action of such paste is slow and if allowed to dry it is of a chalky, soft consistency, since the setting is due to the hydration of some of the lead oxid. Plates pasted with such paste, if dried in the air, would crack and shrink and the material would easily fall from the grids during the handling that is incident to manufacture Moreover, such plates if dried in the air, when completed, would be of inferior quality.

For the sake of further explanation it may be said that if we consider different pastes made from the same oxids and applied to duplicate grids, the quantity of sulfates in each paste will determine the weight of lead available for the formation of active material, because the structure of the grids fixes the volume of paste in each case, and because the quantity of sulfate determines the weight of lead per unit of volume of the pastes. The more sulfate the less weight and greater porosity. If we consider different pastes made from oxid or oxids of different densities and applied to duplicate grids, then the density of the particular oxid or oxids used and the capacity or porosity desired will determine the quantity of sulfate required.

Since the weight of lead in the compounds available for the formation of active material and the volume occupied, are limited when the paste has been applied to the grid, it follows that any subsequent treatment to which the pasted material is subjected will not increase the weight of lead available or the volume occupied, even if such treatment produces additional sulfate in the mass, and all that such additional sulfate can do is to change or modify the structure, as by making it hard and homogeneous.

After the application of the paste and while it is still wet, the plates are not dried in the air, but rather immersed in a sulfating solution such as a weak solution of ammonium sulfate or sulfuric acid, whereupon a further reaction takes place with the surplus lead oxid in the active material which produces lead sulfate in regular interlocking crystals throughout the mass of the plate causing it to set into a hard homogeneous structure. Then the plates may be charged, that is peroxidized or reduced, resulting in active material in a homogeneous uniform mass of desired porosity. The sulfating solution above referred to may be the same solution in which the plates are formed, or a different solution.

From the foregoing it is evident that the porosity and therefore the weight of active material in a given grid may be definitely controlled by the amount of sulfate first introduced into the paste.

In further explanation of the invention, but not with the intention of limiting it, reference may be made to the following quantitative proportions. To obtain a paste containing substantially 10% of sulfate when applied the following proportions are appropriate: Twenty pounds of litharge, 427 c. c., sulfuric acid 1.400 specific gravity and water to make the proper consistency which will be about 800 c. c. After applying the paste the plate is soaked in sulfuric acid of about 1.250 specific gravity for about twenty-four hours. The gravity will diminish during the early part of the soaking so that there should be about 20,000 c. c. for the total amount of paste above given. Having regard to the sulfuric acid solution, which is first mixed with the litharge, either the quantity or the specific gravity may be varied to change the quantity of lead sulfate formed and consequently the porosity of the finished plate.

The following examples are given by way of further description and not limitation:

Paste No. 1 is mixed with water in the proportion of one pound of oxid to 33 c. c.'s of water.

Paste No. 2 is mixed with water in the proportion of one pound of oxid to 43 c. c.'s of water, then 32 c. c.'s of a solution of sulfuric acid of 1.400 specific gravity.

Paste No. 3 is mixed with water in the proportion of one pound of oxid to 50 c. c.'s of water, then 66 c. c.'s of a solution of sulfuric acid of 1.400 specific gravity, then 15 c. c.'s of water, more or less is added to properly temper the paste.

If these three pastes are respectively applied to grids of exactly the same type and dimensions the result of weight of the dry active material when the plates are finished will be substantially as follows:

Paste No. 1____ .2 of a pound per cu. inch.
Paste No. 2____ .15 "  "    "    "   "   "
Paste No. 3____ .11 "  "    "    "   "   "

The quantity of solution preferably used to set the paste is about 5 cu. in. per one cu. in. of plate.

What I claim is:

1. The process of making storage battery plates of predetermined capacity from an oxid or oxids of varying density and lead content, which consists in preparing a paste having a definite weight of lead content per unit of volume from such oxid or oxids by ascertaining the density and lead content of the oxid or oxids used and converting a portion of the oxid into a quantity of lead sulfate appropriate for the ascertained density and lead content of the oxid or oxids used and to the capacity required and leaving sulfatable oxids, applying such a paste to a grid and thereby fixing the volume of such paste used and the lead content in the plate available for the formation of active material, subjecting the plate while the paste is still wet to the action of a sulfating fluid to cause said sulfatable oxids to set and to convert the material available for the formation of active material into a hard homogeneous structure, and charging the plate to produce uniform active material of the desired porosity.

2. The process of making storage battery plates of predetermined capacity from leaden raw material of varying density and lead content, which consists in preparing a paste having a definite weight of lead content per unit of volume from such raw material by ascertaining the density and lead content of the raw materials used and converting a part of the raw material into a quantity of lead sulfate appropriate for the ascertained density and lead content of the raw material used and to the capacity required and leaving sulfatable oxids, and applying such a paste to a grid and thereby fixing the volume of such paste used and the lead content in the plate available for the formation of active material.

In testimony whereof I have hereunto signed my name in the presence of two witnesses.

L. H. FLANDERS.

Witnesses:
W. W. McMAHON,
ALBERT N. DINGEE.